United States Patent
Lee

(10) Patent No.: US 8,286,851 B2
(45) Date of Patent: Oct. 16, 2012

(54) JIG FOR ROUND SOLDER BALL ATTACHMENT

(75) Inventor: Sang Yoon Lee, Gyunggi-do (KR)

(73) Assignee: Samsung Electro-Mechanics Co., Ltd, Suwon, Gyunggi-do (KR)

( * ) Notice: Subject to any disclaimer, the term of this patent is extended or adjusted under 35 U.S.C. 154(b) by 0 days.

(21) Appl. No.: 13/233,710

(22) Filed: Sep. 15, 2011

(65) Prior Publication Data
US 2012/0085810 A1    Apr. 12, 2012

(30) Foreign Application Priority Data
Oct. 7, 2010   (KR) .................. 10-2010-0097772

(51) Int. Cl.
*B23K 37/00*   (2006.01)
(52) U.S. Cl. ........................... 228/41; 228/246
(58) Field of Classification Search .............. None
See application file for complete search history.

(56) References Cited

U.S. PATENT DOCUMENTS

| | | | | |
|---|---|---|---|---|
| 5,768,775 A | * | 6/1998 | Nakazato | 29/843 |
| 6,107,181 A | * | 8/2000 | Kitajima et al. | 438/616 |
| 6,432,806 B1 | * | 8/2002 | Kitajima et al. | 438/613 |
| 7,506,792 B1 | * | 3/2009 | Manfroy et al. | 228/41 |
| 2001/0027990 A1 | * | 10/2001 | Wark | 228/19 |
| 2006/0283012 A1 | * | 12/2006 | Lee | 29/846 |

FOREIGN PATENT DOCUMENTS

| | | | | |
|---|---|---|---|---|
| JP | 08-018209 | A | * | 1/1996 |
| JP | 10-163613 | A | * | 6/1998 |
| JP | 10-163614 | A | * | 6/1998 |
| JP | 2004-172244 | A | * | 6/2004 |
| JP | 2009-111226 | A | * | 5/2009 |
| KR | 1020030021897 | A | | 3/2003 |
| KR | 1020060132404 | A | | 12/2006 |
| KR | 1020060133282 | A | | 12/2006 |

\* cited by examiner

*Primary Examiner* — Kiley Stoner

(74) *Attorney, Agent, or Firm* — Blakely Sokoloff Taylor & Zafman LLP

(57) ABSTRACT

Disclosed herein is a jig for solder ball attachment capable of sensing whether missing balls occur by electrical sensing using an electrical sensor structure in which a conductive thin film is embedded in the jig and electrically sensing whether abnormal solder balls, for example, large ball/small ball/ball size are attached, without confirming whether abnormal solder balls, for example, large ball/small ball/ball size are attached by vision one by one, thereby shortening operating time and improving workability.

4 Claims, 2 Drawing Sheets

JIG FOR ROUND SOLDER BALL ATTACHMENT

CROSS REFERENCE TO RELATED APPLICATION

This application claims the benefit of Korean Patent Application No. 10-2010-0097772, filed on Oct. 7, 2010, entitled "The Jig For Round Solder Ball Attachment" which is hereby incorporated by reference in its entirety into this application.

BACKGROUND OF THE INVENTION

1. Technical Field

The present invention relates to a jig for round solder ball attachment.

2. Description of the Related Art

In manufacturing a flip chip type printed circuit board, one of characteristic processes is a bumping process. The bumping process is generally performed by a printing method; however, may be also performed by a method for directly attaching round solder balls to a pad using separate attachment due to limitations such as usage, design, or the like, of the substrate, when manufacturing the bump for the flip chip.

In this case, the attachment for attaching the solder balls to the pad includes a jig. The bumping process is performed by a method for allowing the jig to attach the solder balls through a vacuum method and then, attaching the jig to the pad.

The bumping process using the attachment including the jig is briefly described below. First, the solder balls are attached by operating the vacuum pump in a state in which the jig is adjacent to the round solder balls scattered on a flat dish, a case, or the like.

Next, the attached solder balls drop to the pad by moving the jig to which the solder balls are attached to a top of the substrate to which a flux is applied and then, stopping the operation of the vacuum pump.

Therefore, the solder balls dropping to the pad are attached by the flux and the flip chip type printed circuit board is manufactured by a series of processes as descried above.

Meanwhile, the bumping process includes attaching the solder balls and sensing to confirm whether the solder balls are attached. In connection with this, these processes generally depend on vision.

As described above, (Patent Document 1), which is a technology for sensing whether the solder balls are attached by using the vision, confirms whether all the solder balls are attached by moving the jig to which the solder balls are attached to a place at which cameras are installed.

That is, if it is confirmed that the solder balls are normally attached through the vision, the jig moves to the substrate. On the other hand, if it is confirmed that the solder balls are missing balls, the jig moves to an initial position to reattach the solder balls, thereby reconfirming whether all the solder balls are attached.

Therefore, the (Patent Document 1) needs to move the jig to the camera and then confirm whether the solder balls are attached, thereby causing the unnecessary operation. As a result, it takes much time to sense whether the solder balls are attached.

Due to the above problem, (Patent Document 2) and (Patent Document 3) have been proposed, which will be briefly described as follows. That is, the (Patent Document 2) and (Patent Document 3) form electrical patterns on a surface of the jig described as a solder ball transfer die and electrically conducts them.

Therefore, the (Patent Document 2) and (Patent Document 3) does not have to use the vision since whether the solder balls are attached may be sensed according to whether the electrical patterns are conducted to each other.

[Citation List]
[Patent Documents]
(Patent Document 1) KR10-2003-0021897 A
(Patent Document 2) KR10-2006-0133282 A
(Patent Document 3) KR10-2006-0132404 A However, as described above, the (Patent Document 2) and (Patent Document 3) may sense and determine only whether the solder balls are normally attached to the receiving groove formed on the transfer die since the electrical patterns are formed only on the surface of the transfer die.

That is, the (Patent Document 2) and (Patent Document 3) secure the function of sensing whether the solder balls are attached, but do not secure whether the function of sensing whether the abnormal solder balls are attached to the receiving groove. In order to confirm whether the solder balls are attached to the receiving groove, the (Patent Document 2) and (Patent Document 3) may need to confirm whether the solder balls are attached to the receiving groove only by the vision like the (Patent Document 1).

SUMMARY OF THE INVENTION

The present invention has been made in an effort to sense whether the abnormal solder balls are attached, which may not be sensed by the (Patent Document 2) and (Patent Document 3), by electrical sensing, thereby removing the time consumption needed to check the vision and the inconvenience of operation.

In addition, the present invention has been made in an effort to provide a jig for solder ball attachment capable of electrically sensing whether solder balls are attached and whether solder balls are defective.

According to a preferred embodiment of the present invention, there is provided a jig for solder ball attachment, including: a body made of an insulating material and provided with holes for attachment to attach solder balls by a vacuum method; and a conductive thin film disposed in the body, wherein the body is formed with a receiving space and has the conductive thin film embedded therein so as to be exposed on the receiving space contacting the solder balls.

The conductive thin film may be machined so as to be disposed on the same line as an edge of the receiving space.

DESCRIPTION OF THE PREFERRED EMBODIMENTS

Hereinafter, preferred embodiments of the present invention will be described in more detail with reference to the accompanying drawings.

Figure 1:
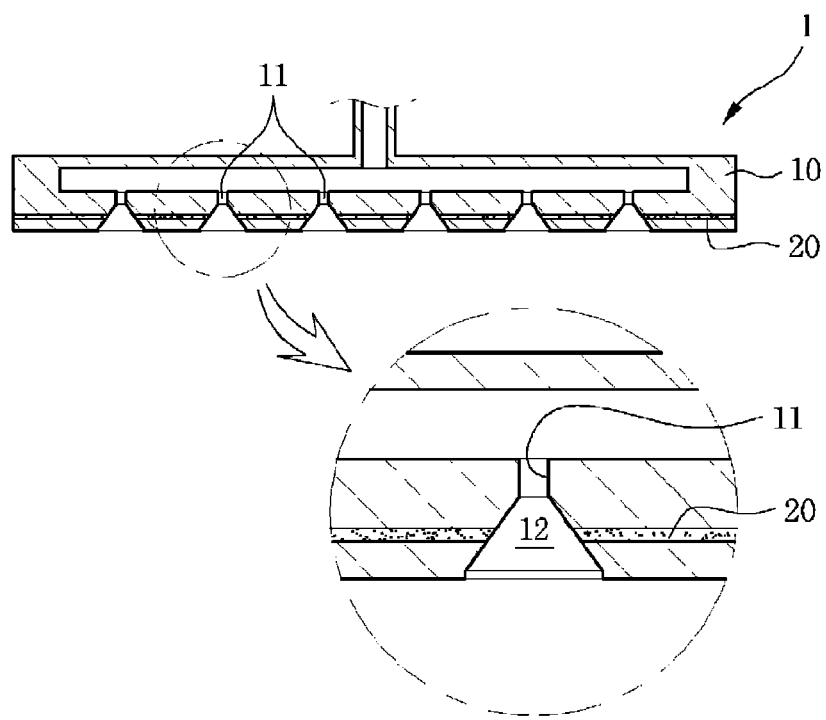
FIG. 1 is a cross-sectional view showing an inner structure by cutting a jig for solder ball attachment according to a preferred embodiment of the present invention.

A jig 1 for solder ball attachment according to a preferred embodiment of the present invention includes a body 10 in which holes 11 for attachment capable of attaching solder balls 2 by a vacuum method is formed, as shown in FIG. 1.

The body 10 is made of an insulating material such as resin and the holes 11 for attachment formed therein are connected with a vacuum pump (not shown) to attach the solder balls 2 by the vacuum method.

Meanwhile, the jig 1 according to the preferred embodiment of the present invention includes a conductive thin film 20. The conductive thin film 20 is disposed in the body 10 so as to sense whether the solder balls 2 are attached, in particular, disposed between the holes 11 for attachment.

Therefore, when measuring a resistance value by applying current to the jig 1 in a state in which the solder balls 2 are attached through the holes 11 for attachment, the resistance value is measured by a current path through which current flows when the solder balls 2 are attached.

On the other hand, when the solder balls 2 are not attached to the holes 11 for to attachment, the current path is disconnected to interrupt the flowing of current, such that the resistance value may not be measured. As a result, it is possible to easily sense whether a missing ball occurs.

Figure 2:
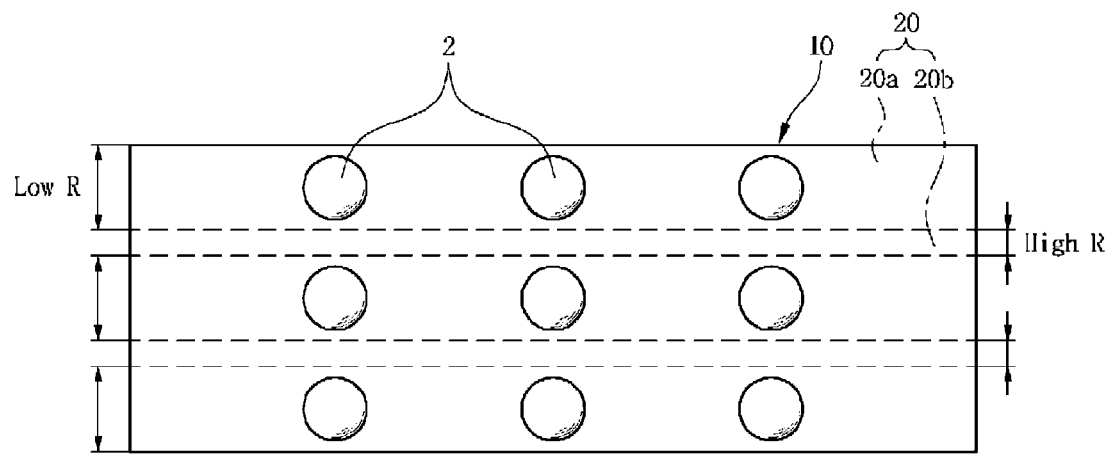
FIG. 2 is a schematic diagram showing a disposition state of a conductive thin film according to the preferred embodiment of the present invention.

As another preferred embodiment of the present invention, as shown in FIG. 2, the conductive thin film 20 having different resistance values is disposed in the body 10. In this case, the resistance value is a relative concept. For convenience of explanation, in the preferred embodiment of the present invention, it is to be noted that the conductive thin film 20 having a relatively lower resistance value is referred to as a first thin film 20a and the conductive thin film 20 having a relatively higher resistance value is referred to as a second thin film 20b.

That is, when measuring the resistance value by disposing the first thin film 20a between the holes 11 for attachment to form a low resistance area LOW R and disposing the second thin film 20b on the body 10 without the holes 11 for attachment to form a high resistance area High R and then, applying current to the jig 1, current gradient passes through the low resistance area LOW R to measure the low resistance value when the solder balls 2 are attached.

On the other hand, when the solder balls 2 are not attached, the current path passes through the relatively higher resistance area High R to measure the high resistance value, thereby electrically sensing whether the solder balls 2 are attached.

Figure 3:
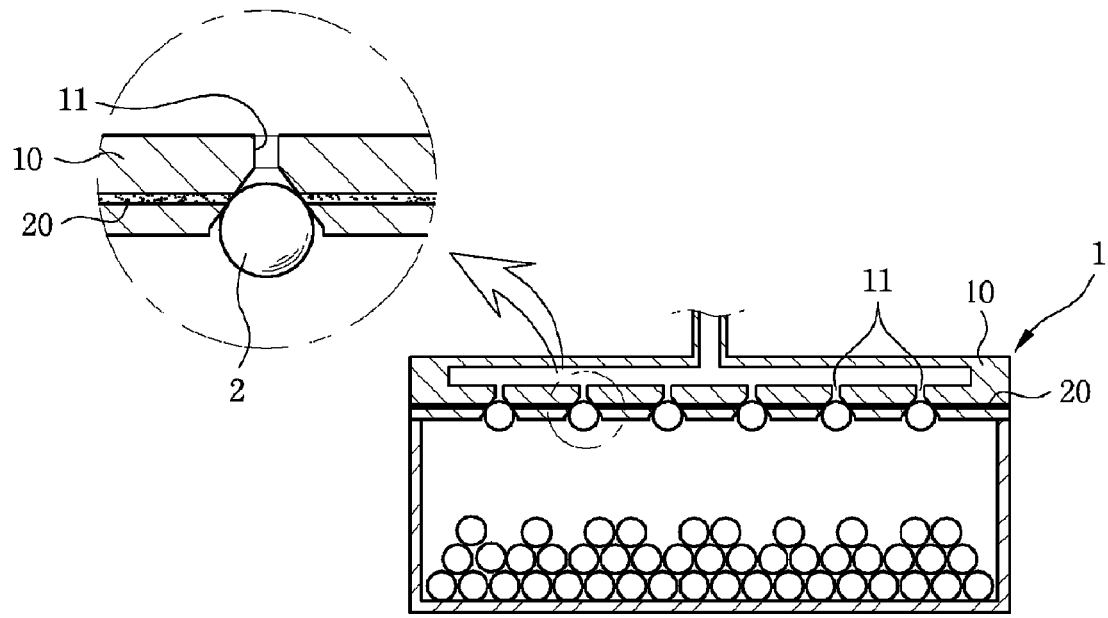
FIG. 3 is a cross-sectional view showing a state of the solder ball attachment by cutting the jig for solder ball attachment according to the preferred embodiment of the present invention.

Meanwhile, the preferred embodiment of the present invention may sense whether the solder balls 2 are attached and the whether the abnormal solder balls for example, large ball/small ball/ball size are attached. To this end, as shown in FIG. 1 or 3, the receiving space 12 is formed in the body 10 and the conductive thin film 20 is embedded in the body 10 at a predetermined depth.

In this case, the receiving space 12 is formed by extending a tip portion of the holes 11 for attachment and the tip of the conductive thin film 20 is disposed in the receiving space 12 contacting the round solder ball 2 so as to be exposed to the outside.

Figure 4:
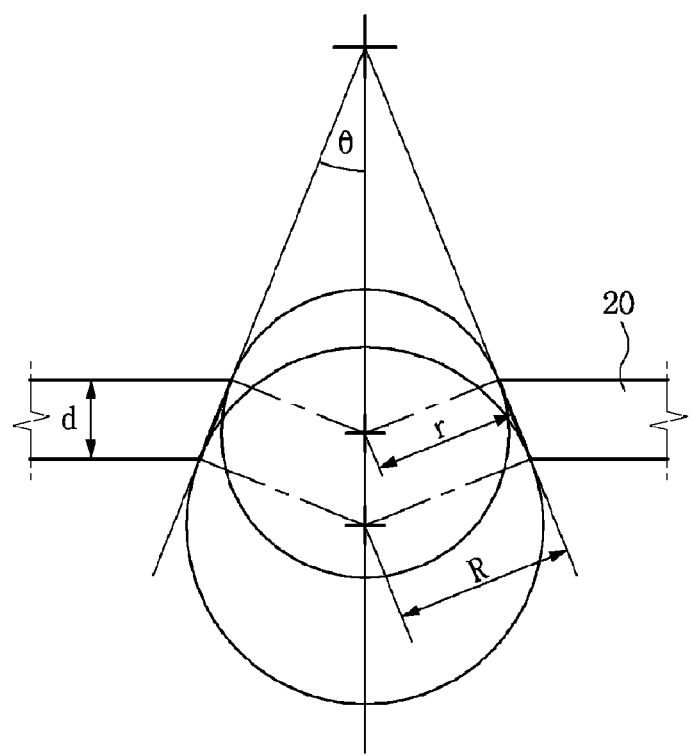
FIG. 4 is a schematic diagram for showing a state in which the solder balls are sensed by the conductive thin film according to the preferred embodiment of the present invention.

Therefore, as shown in FIG. 4 as the preferred embodiment of the present invention, it is possible to easily sense whether the solder ball 2 is defective by deriving a central value r of the solder value 2 according to Equation $$R - r = \frac{\sin\theta}{\cos^2\theta} d$$

using a thickness d of the conductive thin film 20 and an inclined angle (θ) of the receiving space 12 and comparing the central value with a normal central value R.

That is, it is possible to previously prevent defects of raw material by filtering the abnormal solder ball 2 attached to the receiving space 12 using the conductive thin film 20 embedded in the body 10, at a lot test level.

In order to precisely performing the recognition degree of the solder ball 2 without errors, it is more preferable to machine the receiving space 12 and the conductive thin film 20 so as to be disposed on the same line.

Further, the recognition of the solder balls 2 may vary according to the thickness d of the conductive thin film 20. It is possible to control the size of the solder ball 2 by controlling the inclined angle (θ) of the receiving space 12 and the thickness of the conductive thin film 20.

According to the preferred embodiment of the present invention, when the inclined angle of the receiving space 12 is machined so as to be 45° and the thickness d of the conductive thin film is machined so as to be 20 µm, the radius of the solder ball 2 is controlled to be 14 µm before and after the central value on the basis of the foregoing Equation, such that other solder balls 2 out of the range is automatically recognized as the defects.

Therefore, when confirming whether the solder balls 2 are defective, the preferred embodiment of the present invention can sense the size and form of the solder ball through the conductive thin film 20 embedded in the body 10 without using the separate vision.

As set forth above, the preferred embodiment of the present invention can electrically sense whether the solder balls are attached and the abnormal solder balls are attached by the electrical sensing, thereby simplifying the process due to the exclusion of the vision check, shortening the operation time, and improving the workability.

That is, the prior art according to the (Patent Document 2) and (Patent Document 3) can sense only whether the solder balls are attached. On the other hand, the preferred embodiment of the present invention can electrically sense whether the abnormal solder balls are attached without performing the vision check, thereby remarkably shortening the process and operating time and significantly improving the workability.

In addition, the preferred embodiment of the present invention can machine the receiving space to which the solder balls are attached and the conductive thin film so as to be disposed on the same line, thereby precisely performing the sensing of the solder ball and whether the solder balls are normal without errors and improving the working efficiency.

Although the preferred embodiments of the present invention have been disclosed for illustrative purposes, they are for specifically explaining the present invention and thus the jig for solder ball attachment according to the present invention is not limited thereto, but those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A jig for solder ball attachment, comprising:

a body made of an insulating material and provided with holes for attachment to attach solder balls by a vacuum method; and a first conductive film and a second conductive film having different resistance values disposed in the body;

wherein at least one of the holes is formed with a receiving space and the body has the first conductive film disposed so as to be exposed on the receiving space so as to contact a solder ball.

2. The jig for solder ball attachment as set forth in claim 1, wherein a side of the first conductive film that is disposed on the receiving space is disposed on a same line as an edge of the receiving space.

3. The jig for solder ball attachment as set forth in claim 1, wherein the first conductive film has a lower resistance value than the second conductive film.

4. The jig for solder ball attachment as set forth in claim 1, wherein the first conductive film is disposed between the holes.

* * * * *